United States Patent
Han et al.

(10) Patent No.: US 7,305,165 B2
(45) Date of Patent: Dec. 4, 2007

(54) OPTICAL FIBER FOR METRO NETWORK

(75) Inventors: Ju-Chang Han, Gumi-si (KR);
Sung-Koog Oh, Gumi-si (KR);
Yun-Geun Jang, Gumi-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 296 days.

(21) Appl. No.: 10/963,940

(22) Filed: Oct. 13, 2004

(65) Prior Publication Data

US 2005/0265676 A1    Dec. 1, 2005

(30) Foreign Application Priority Data

May 28, 2004  (KR)  ............ 10-2004-0038551

(51) Int. Cl.
*G02B 6/22*  (2006.01)
(52) U.S. Cl. ............... 385/123; 385/124; 385/126; 385/127; 385/147
(58) Field of Classification Search ............... 385/123, 385/124, 126, 127, 147
See application file for complete search history.

(56) References Cited

U.S. PATENT DOCUMENTS

| | | | |
|---|---|---|---|
| 5,483,612 A | 1/1996 | Gallagher et al. | 385/127 |
| 6,396,987 B1 * | 5/2002 | de Montmorillon et al. | 385/123 |
| 6,421,491 B1 * | 7/2002 | Liu | 385/127 |
| 6,445,864 B2 * | 9/2002 | Jiang et al. | 385/127 |
| 6,628,873 B1 | 9/2003 | Sillard et al. | |
| 7,003,205 B2 * | 2/2006 | Cho et al. | 385/126 |
| 7,116,876 B2 * | 10/2006 | Jang et al. | 385/123 |
| 7,120,341 B2 * | 10/2006 | Oh et al. | 385/123 |
| 2002/0006259 A1 * | 1/2002 | Tirloni | 385/127 |
| 2003/0048746 A1 * | 3/2003 | Guess et al. | 370/219 |
| 2003/0152347 A1 * | 8/2003 | Matsuo et al. | 385/123 |
| 2003/0190128 A1 * | 10/2003 | Jang et al. | 385/124 |
| 2005/0175303 A1 * | 8/2005 | Jang et al. | 385/124 |

FOREIGN PATENT DOCUMENTS

| | | |
|---|---|---|
| CN | 1186250 | 7/1998 |
| WO | WO2004/015467 A1 | 2/2004 |

* cited by examiner

*Primary Examiner*—Frank G. Font
*Assistant Examiner*—James P. Hughes
(74) *Attorney, Agent, or Firm*—Cha & Reiter, LLC

(57) ABSTRACT

An optical fiber for use in a metro network is provided. The optical fiber has a loss of 0.25 dB/km or less in the C-band and the L-band, a zero dispersion wavelength between 1560 nm and 1560 nm, and a dispersion slope of at least 0.074 ps/nm$^2$/km at a wavelength of 1550 nm.

5 Claims, 6 Drawing Sheets

OPTICAL FIBER FOR METRO NETWORK

CLAIM OF PRIORITY

This application claims priority to an application entitled "optical fiber for metro network," filed in the Korean Industrial Property Office on May 28, 2004 and assigned Ser. No. 2004-38551, the contents of which are hereby incorporated by reference.

BACKGROUND OF THE INVENTION

1. Field of the Invention

The present invention relates to a metro network and, more particularly, to an optical fiber used in a metro network as a transmission line.

2. Description of the Related Art

In order to meet the demand for higher transmission and reception of data at a high speed, wavelength division multiplexing (WDM) optical communication systems are being implemented. The WDM optical communication systems can be classified into dense wavelength division multiplexing (DWDM) systems and coarse wavelength division multiplexing (CWDM) systems. Further, optical communication networks employed in wavelength division multiplexing optical communication systems can be classified into access networks, metro access networks, metro core networks, long-haul networks, ultra-long haul networks, etc.

The access network interconnects nodes within a distance of 1 km to 5 km; the metro access network interconnects nodes within a distance of 20 km to 100 km; the metro core network interconnects nodes within a distance of 100 km to 300 km; the long-haul network interconnects nodes within a distance of 300 km to 1000 km, and the ultra-long haul network interconnects nodes apart from each other by a distance of at least 1000 km.

The access network and the metro access network typically employ single-mode optical fibers. An optical fiber employed in the metro access network has a negative dispersion characteristic and includes a core having a high refractive index and a clad surrounding the core. The optical fiber may include an annular portion formed between the core and the clad and having a refractive index lower than that of the core.

U.S. Pat. No. 4,715,679 issued to Bhagavatula discloses a single-mode optical waveguide comprising a core having at least one annular region with a depressed refractive index and a clad surrounding the core.

A metro network is more economical in the implementation at a low transmission speed through employing a direct modulation (DM) scheme instead of an external modulation (EM) scheme. The direct modulation scheme typically employs a directly modulated distributed feedback laser (DM-DFB) as a light source for generating an optical signal. The DM-DFB has a positive chirp. Therefore, wavelength dispersion occurs when the light source transmits an optical signal, via an optical fiber having a positive dispersion in the wavelength band of 1550 nm, more than a predetermined distance. The wavelength dispersion may cause a distortion of an optical signal and may cause a noise such as cross talk between optical signals. Therefore, it is necessary for a metro network to have additionally a dispersion compensation fiber module for compensating the dispersion of an optical signal as described above.

Further, the direct modulation-type metro network using an optical fiber having a positive dispersion characteristic must include at least one dispersion compensation fiber module, which complicates the construction of the network and increases cost for installing the network.

In order to avoid the complex construction of the network, there has been proposed a method of constructing a metro network using an optical fiber having a negative dispersion characteristic.

However, this method may have limitations in the transmission distance. FIG. 1 is a graph showing the curves of Q-factors for a typical single-mode fiber (SMF) and typical negative-dispersion fibers (NDFs) according to the transmission distance. Specifically, FIG. 1 shows a Q-factor curve for the transmission of a pre-amplified optical signal having an extinction ratio of 5 dB through a first NDF, a Q-factor curve for the transmission of a pre-amplified optical signal having an extinction ratio of 8 dB through a second NDF, a Q-factor curve for the transmission of an optical signal without being pre-amplified, which has an extinction ratio of 8 dB, through a third NDF, and a Q-factor curve for the transmission of an optical signal without being pre-amplified, which has an extinction ratio of 8 dB, through the SMF. It is difficult for a typical SMF to have a good transmission property due to the chirping during the direct modulation. Also, it is noted that a typical NDF has a limitation in the transmission distance due to its large negative dispersion characteristic.

Recently, in order to minimize the distance limitation, which may be caused in an optical fiber having a positive dispersion characteristic, a method of employing an optical fiber having a dispersion value between −7 and −8 ps/nm/km at a wavelength of 1550 nm has been proposed. The optical fiber having a dispersion value between −7 and −8 ps/nm/km has a dispersion characteristic proper for the C-band area (1530~1565 nm). Unfortunately, such a large negative dispersion value of the optical fiber, i.e, a dispersion value between −7 and −8 ps/nm/km, makes it difficult to apply the optical fiber to a metro network when the transmission of an optical signal requires a distance range of at least 100 km in an L-band area (1565~1625 nm) at a speed of 10 Gps.

SUMMARY OF THE INVENTION

Accordingly, the present invention has been made to solve the above-mentioned problems occurring in the prior art and provides additional advantages, by providing an optical fiber that can be employed in a long-distance optical communication network for high speed communication, such as a metro network.

One aspect of the present invention is to provide an optical fiber that can be used for the transmission of optical signals in both the C-band and the L-band.

In one embodiment, there is provided an optical fiber for a metro network, wherein the optical fiber has a loss of 0.25 dB/km or less in the C-band and the L-band, a zero dispersion wavelength between 1560 nm and 1560 nm, and a dispersion slope of at least 0.074 ps/nm$^2$/km at a wavelength of 1550 nm.

A BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
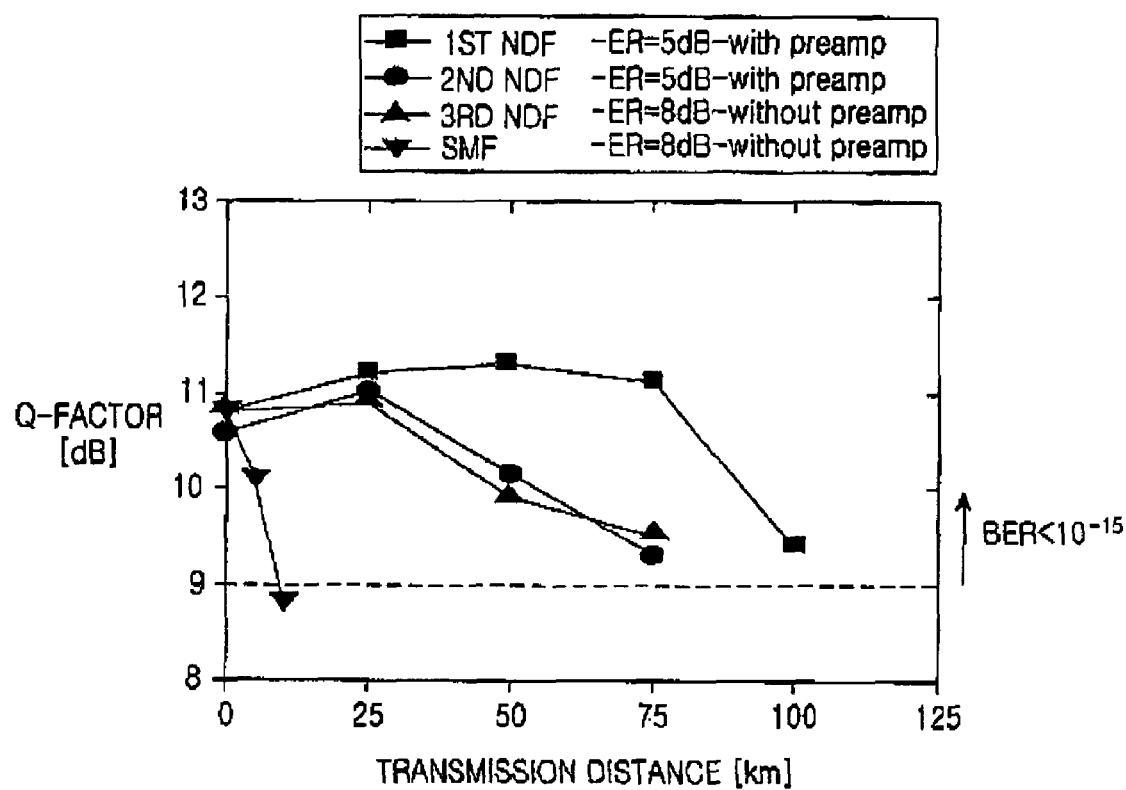
FIG. 1 is a graph showing Q-factor curves for a typical single-mode fiber (SMF) and typical negative-dispersion fibers (NDFs) according to the transmission distance.
Figure 2A:
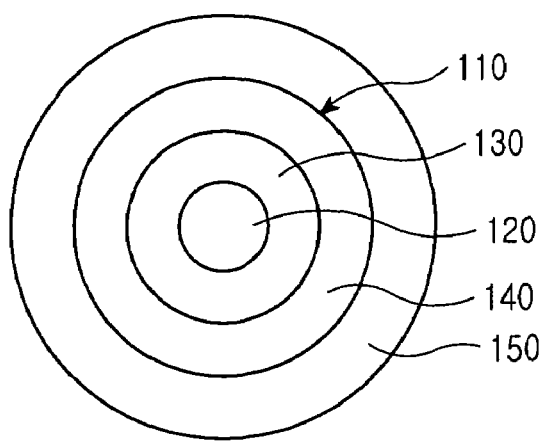
FIG. 2A shows a structure of an optical fiber for a metro network according to an embodiment.
Figure 2B:
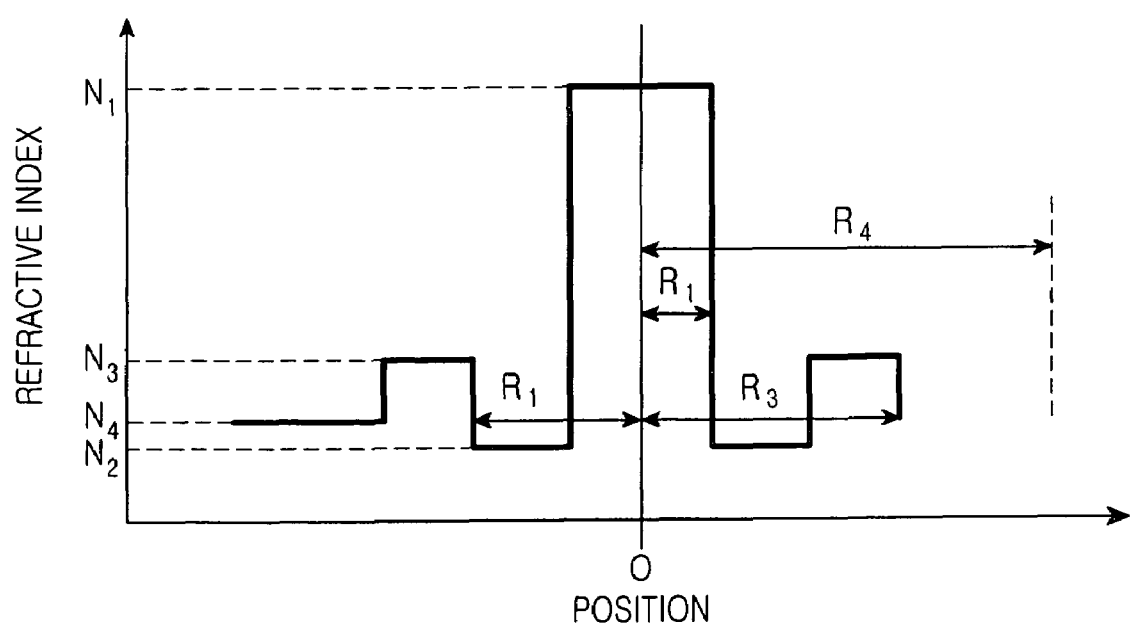
FIG. 2B is a graph showing the profile of a refractive index of the optical fiber shown in FIG. 2A.

FIG. 2A shows the structure of an optical fiber according to an embodiment of the present invention, and FIG. 2B illustrates the profile of a refractive index of the optical fiber shown in FIG. 2A.

Referring to FIG. 2A, an optical fiber 100 applicable in a metro network includes a core 110 and a clad 150. The core 110 includes a central region 120, a refractive index-depressed region 130, and an annular region 140.

The central region 120 has a cylindrical portion, defining the center of the optical fiber 100, with a radius R1 from the center of the optical fiber 100, and has a refractive index of N1, which is highest refractive index of the optical fiber 100.

The refractive index-depressed region 130 surrounds the central region 120 and has a refractive index of N2, which is lowest refractive index of the optical fiber 100. The inner circumference of the refractive index-depressed region 130 coincides with the outer circumference of the central region 120. The outer circumference of the refractive index-depressed region 130 has a radius R2 from the center of the optical fiber 100.

The annular region 140 surrounds the refractive index-depressed region 130 and has a refractive index of N3, which is larger than N2 but smaller than N1. The inner circumference of the annular region 140 coincides with the outer circumference of the refractive index-depressed region 130. The outer circumference of the annular region 140 has a radius R3 from the center of the optical fiber 100.

The clad 150 surrounds the annular region 140 and has a refractive index of N4, which is larger than N2 but smaller than N3. The inner circumference of the clad 150 coincides with the outer circumference of the annular region 140. The outer circumference of the clad 150 has a radius R4 from the center of the optical fiber 100.

Figure 3:
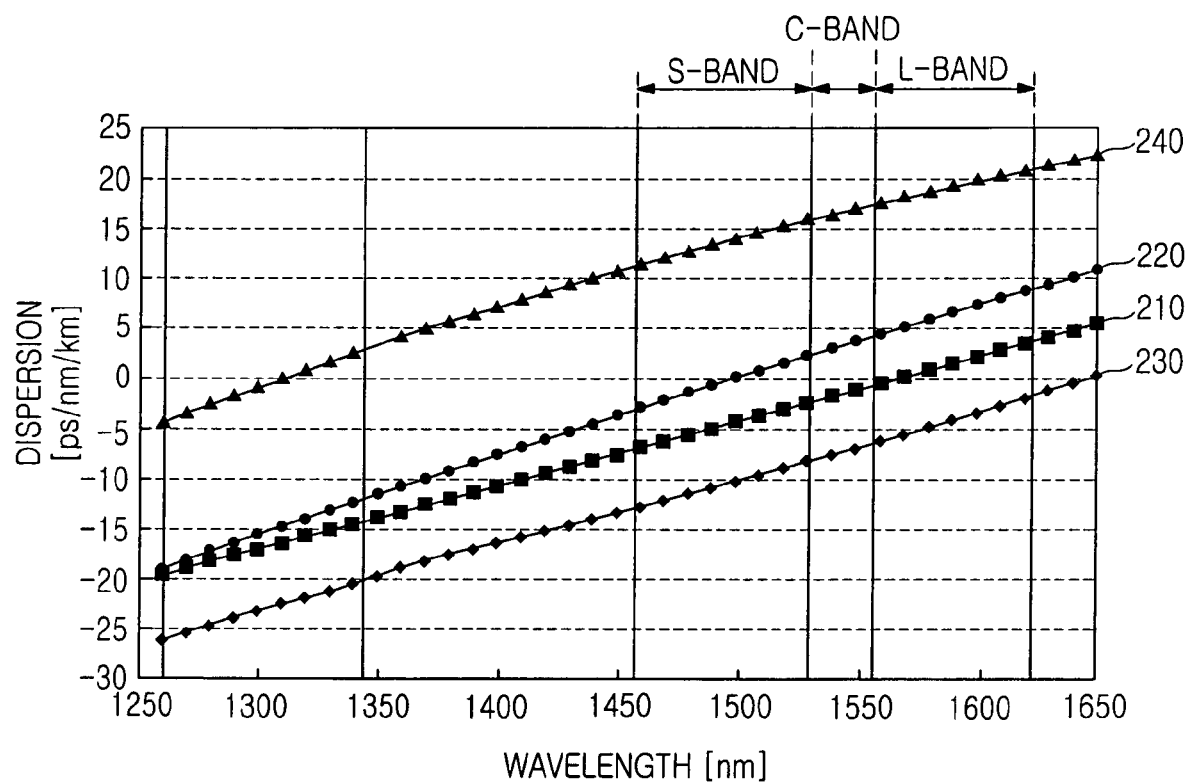
FIG. 3 is a graph showing a comparison between dispersion characteristics of the optical fiber shown in FIG. 2A, a non-zero dispersion shifted fiber having a typical negative dispersion value, and a single-mode fiber having a positive dispersion value.

FIG. 3 is a graph showing a comparison between the dispersion characteristics of the optical fiber shown in FIG. 2A, a non-zero dispersion shifted fiber (hereinafter, referred to as "NZDSF") having a typical negative dispersion value, and a single-mode fiber (SMF) having a positive dispersion value in order to assist the understanding of the present invention.

In particular, FIG. 3 shows a dispersion curve (hereinafter, referred to as "a first dispersion curve") 210 of the optical fiber shown in FIG. 2A, used in a metro network with a transmission distance of about 200 km. It also shows a dispersion curve (hereinafter, referred to as "a second dispersion curve") 230 of a NZDSF having a typical negative dispersion value, a dispersion curve (hereinafter, referred to as "a third dispersion curve") 220 of a NZDSF having a typical positive dispersion value, and a dispersion curve (hereinafter, referred to as "a fourth dispersion curve") 240 of a typical single-mode fiber employed in a coarse wavelength division multiplexing (CWDM), each of the dispersion curves depending on the wavelength.

The first dispersion curve 210 has a negative dispersion value in the C-band and a positive dispersion value in the L-band, such that the zero dispersion location of the optical fiber shown in FIG. 2A coincides with the dead zone of an existing erbium-doped optical fiber amplifier, thereby obtaining a maximum channel efficiency. Preferably, the zero dispersion wavelength of the first dispersion curve 210 is located in a range between 1560 nm and 1570 nm. Therefore, the channel efficiency can be improved drastically and an economical long distance optical communication network can be realized using an optical fiber having the first dispersion curve 210 by employing a direct modulation scheme in the C-band region in which the first dispersion curve 210 has a negative dispersion value and an external modulation scheme in the L-band region in which the first dispersion curve 210 has a positive dispersion value.

The second dispersion curve 230 has a negative dispersion value at most −10 ps/nm/km at the wavelength band of 1550 nm. That is, the optical fiber having the second dispersion curve 230 has an excessively large negative dispersion value that makes it impossible to apply the optical fiber to a long-distance optical communication network having a transmission distance of more than 200 km. The third dispersion curve 220 has a high positive dispersion value in the C-band and the L-band, and thus an optical fiber having the third dispersion curve 220 cannot be used for a long-distance optical communication network without compensating for the dispersion.

The fourth dispersion curve 240 shows a dispersion characteristic of a single-mode optical fiber usable in a wavelength band between 1250 nm and 1450 nm. As noted, the fourth dispersion curve 240 has a dispersion value higher than approximately 10 ps/nm/km in a wavelength band above the S-band, and it is thus difficult to employ an optical fiber having the fourth dispersion curve 240 in a long-distance optical communication network.

Figure 4:
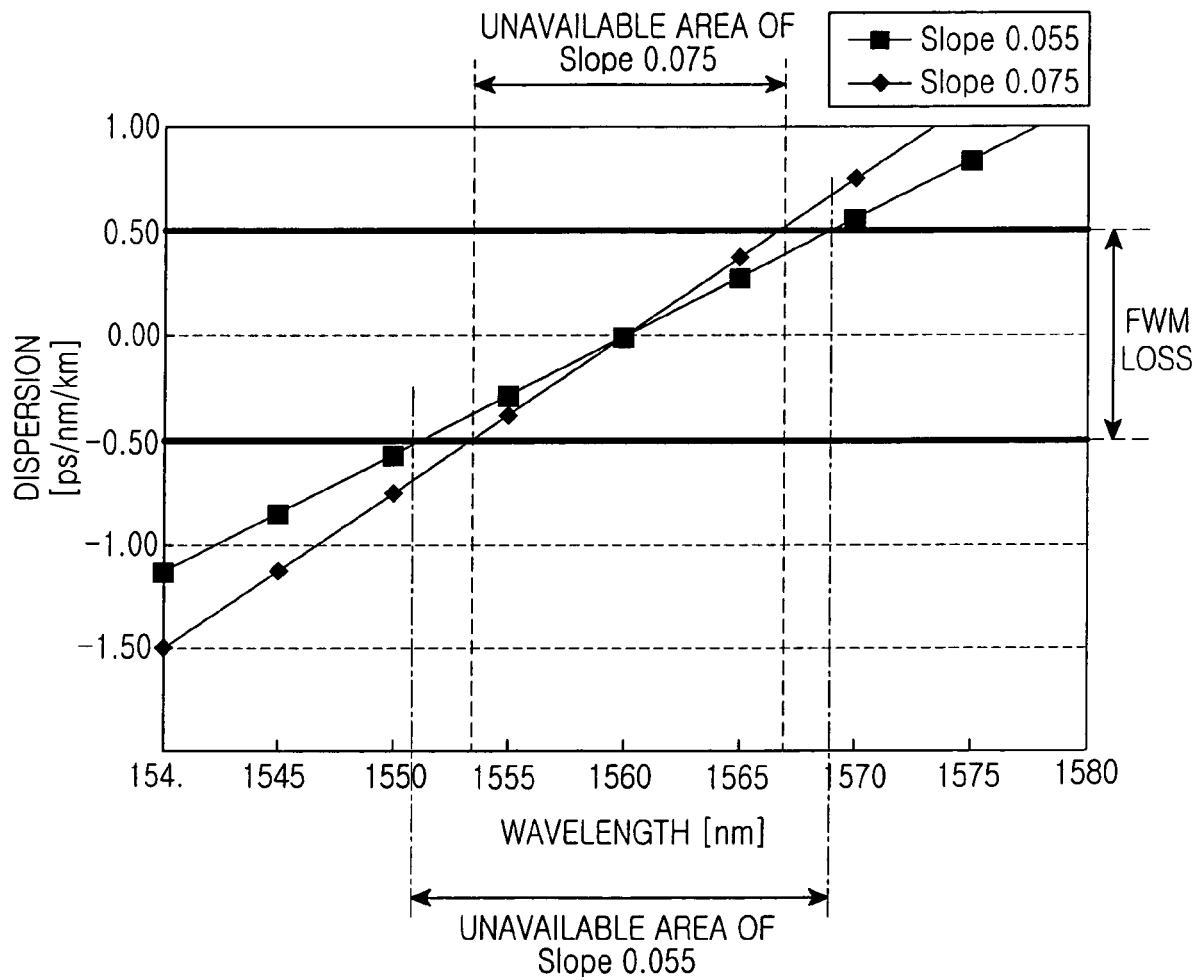
FIG. 4 is a graph showing a relation between the dispersion slopes of the optical fiber shown in FIG. 2A and the wavelength bands.

FIG. 4 is a graph showing a relationship between the dispersion slopes of the optical fiber shown in FIG. 2A and different wavelength bands. Specifically, FIG. 4 shows dispersion curves of the optical fiber shown in FIG. 2A, which have dispersion slopes of 0.055 ps/nm²/km and 0.075 ps/nm²/km, respectively, when the optical fiber has a zero dispersion wavelength of 1560 nm. The four-wave mixing (FWM) loss area shown in FIG. 4 is caused by a non-linear phenomenon called "four-wave mixing," which limits the transmission distance, and refers to a range for the dispersion value. The FWM loss area usually becomes larger at the range of a dispersion value between −0.5 and 0.5 ps/nm/km.

In other words, an optical fiber having a dispersion slope of 0.075 ps/nm²/km or greater has a wavelength band between about 1552.5 nm and 1567.5 nm within the FWM loss area, that is, an approximately 13 nm-wide wavelength band. In contrast, an optical fiber having a dispersion slope of 0.055 ps/nm²/km, which is less than 0.075 ps/nm²/km, has a wavelength band between approximately 1551.25 nm and 1533.75 nm within the FWM loss area, that is, an approximately 17.5 nm-wide wavelength band.

In conclusion, an optical fiber having a dispersion slope of 0.075 ps/nm²/km or greater according to the present invention has an available wavelength band that is wider than that of the optical fiber having a dispersion slope less than 0.075 ps/nm²/km.

Figure 5:
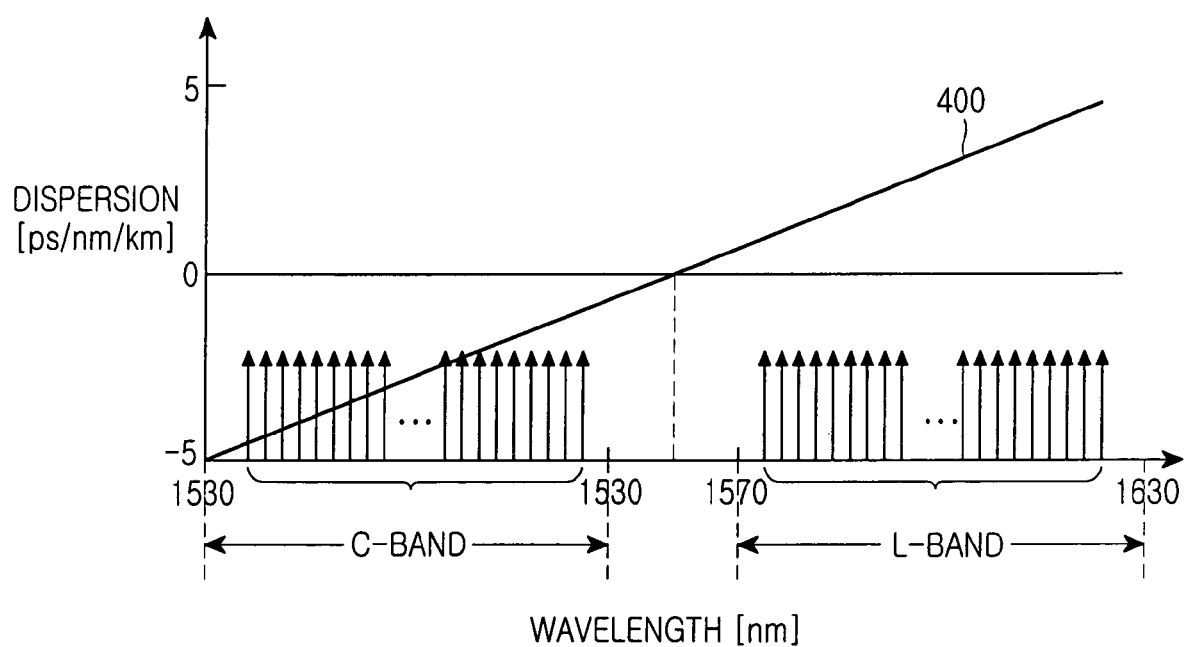
FIG. 5 shows a dispersion slope of an optical fiber according to another embodiment of the present invention; and, FIG. 6 is a graph showing a comparison between the transmission distances of an optical fiber according to the present invention and a conventional single-mode optical fiber.

FIG. 5 shows the dispersion slope of an optical fiber according to another embodiment of the present invention. As shown, the dispersion slope curve 400 has a zero dispersion wavelength of 1565.4 nm and a dispersion slope of 0.093 ps/nm²/km. An optical fiber having the dispersion slope curve 400 may be used both in the C-band between 1530 nm and 1560 nm and the L-band between 1571 nm and 1610 nm.

In the C wavelength band, a plurality of channels having different wavelengths can be generated, and each of the generated channels can be modulated into optical signals through direct modulation. In the L wavelength band, a plurality of channels having different wavelengths can be generated also. However, in the L wavelength band, each of the generated channels can be modulated into optical signals through an external modulation.

Figure 6:
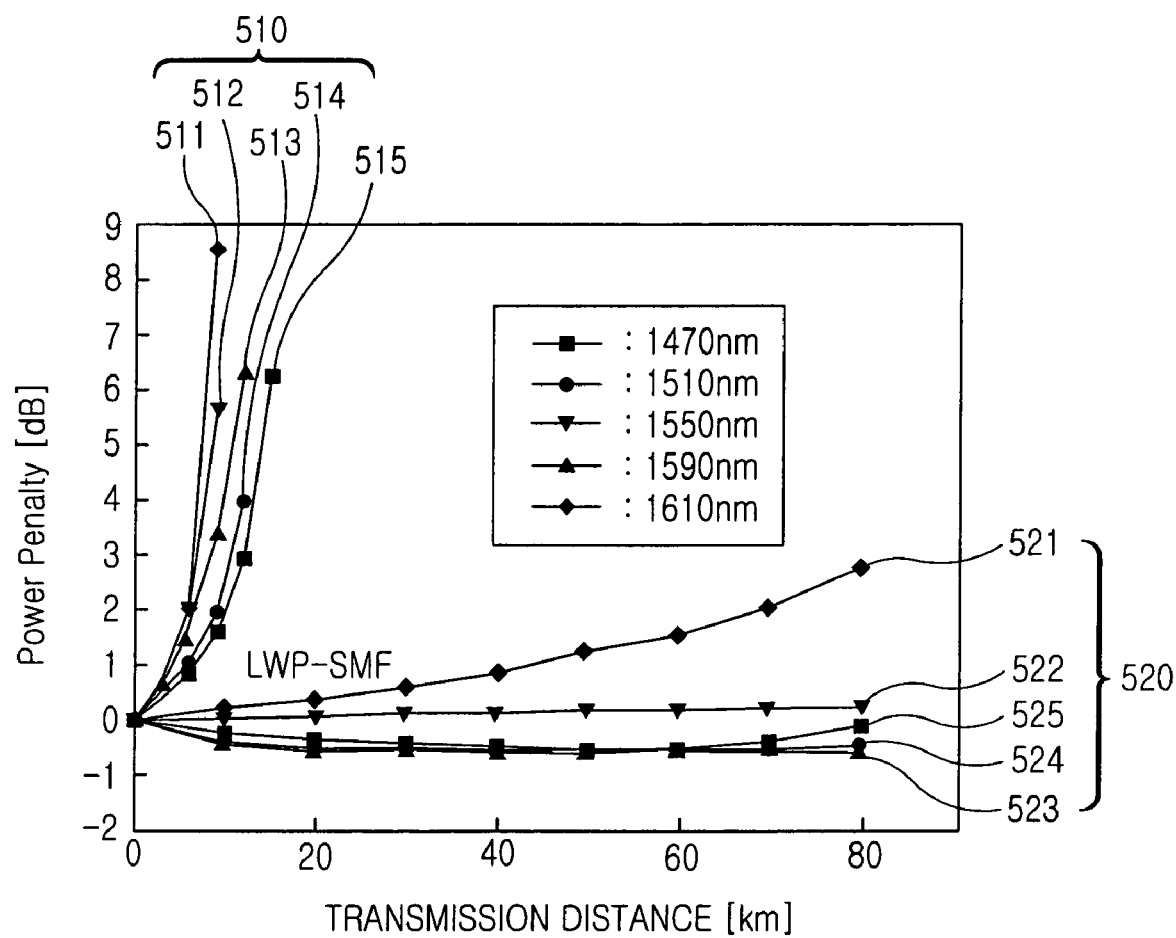

FIG. 6 is a graph showing a comparison between the transmission distances of an optical fiber according to the present invention and a conventional single-mode optical fiber. As shown, the conventional single-mode fibers 510 show the power penalties that are lower than about 1 dB within a distance of 5 km and rapidly increase at a distance exceeding 10 km. Therefore, it is noted that the conventional single-mode fibers 510 are not proper for a network covering an area larger than the coverage of the access network. In contrast, the zero dispersion fibers 520 according to the present invention show nearly constant power penalties between −1 and 1 dB within a transmission distance even up to 80 km.

In the L wavelength band (1610 nm), the power penalty of the optical fiber according to the present invention increases up to 3 dB but does not rapidly increase above 3 dB. Further, the power penalty for the other wavelength (1590 nm) in the L-band has shown a result similar to those for the C-band (1550 nm) and the S-band (1470 and 1510 nm).

Accordingly, the zero dispersion fibers 520 according to the present invention have constant power penalties for a long-distance transmission within a transmission distance of 80 km and can be used even for not only the C-band and the L-band but also the S-band.

As it is apparent from the foregoing, the present invention has an advantage in that it accords a dead zone of an optical fiber amplifier, etc., with a zero dispersion location of an optical fiber for constructing a long-distance optical communication network, thereby enabling both the C-band and the L-band to be available. Therefore, the present invention can provide a long-distance optical communication network that can easily secure available channels and available communication capacity.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical fiber for a metro network, wherein the optical fiber has a loss of 0.25 dB/km or less in C-band and L-band, a zero dispersion wavelength between 1560 nm and 1570 nm, and a dispersion slope of at least 0.074 ps/nm²/km at a wavelength of 1550 nm, wherein the C-band is modulated into optical signals through a direct modulation and the L-band is modulated into optical signals through an external modulation.

2. The optical fiber as claimed in claim 1, wherein the optical fiber comprises:

a core including a central region and a refractive index-depressed region, the central region having a first refractive index N1, the refractive index-depressed region having a second refractive index N2 and surrounding the central region, the first refractive index N1 having a maximum refractive index of the optical fiber and the second refractive index N2 having a minimum refractive index of the optical fiber; and a clad including an inner clad portion and an outer clad portion, the inner clad portion having a third refractive index N3 and surrounding the refractive index-depressed region, the outer clad portion having a fourth refractive index N4 and surrounding the inner clad portion, the third refractive index N3 being equal to or larger than the second refractive index N2.

3. The optical fiber as claimed in claim 1, wherein the optical fiber has an effective sectional area of at least 55 μm² at a wavelength of 1550 nm.

4. The optical fiber as claimed in claim 1, wherein the optical fiber has a negative dispersion value in the C-band and a positive dispersion value in the L-band.

5. The optical fiber as claimed in claim 2, wherein the first to fourth refractive indices of the optical fiber have relations, $0.34\% \leq (N1-N4)N4 \leq 0.55\%$ and $-0.005\% \geq (N2-N4)/N4 \geq -0.01\%$.

* * * * *